Nov. 14, 1950 A. D. MEYER ET AL 2,529,660

HAND AND POWER DRIVE

Filed Oct. 25, 1944

INVENTOR
Alvin D. Meyer and
Carl F. Carlzen

BY C. A. Norton
ATTORNEY

Patented Nov. 14, 1950

2,529,660

UNITED STATES PATENT OFFICE 2,529,660

HAND AND POWER DRIVE

Alvin D. Meyer, Kenmore, and Carl F. Carlzen, Buffalo, N. Y., assignors to Colonial Radio Corporation, Buffalo, N. Y.

Application October 25, 1944, Serial No. 560,290

2 Claims. (Cl. 74—625)

Figures 1, 2, 3, 4:
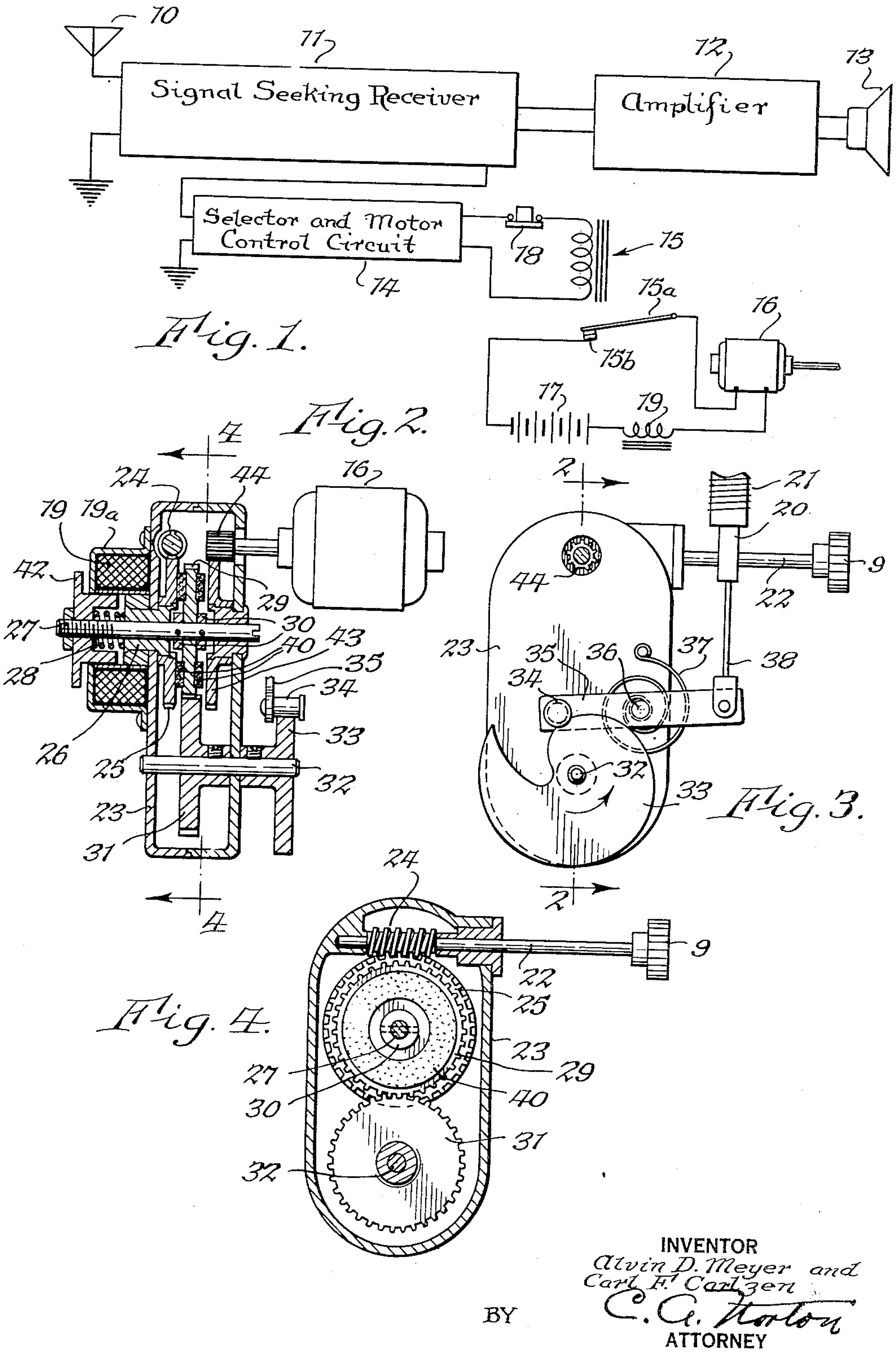

This invention relates to signal seeking receivers, and more particularly to improved mechanical arrangements for employing either a motor or manual drive for the tuning of such receivers, together with improved arrangements whereby very precise and accurate tuning may be employed.

In signal seeking receivers, also sometimes called signal tuned receivers or stop-on-carrier receivers, there is usually provided some form of power drive for adjusting the tuning instrumentality. This may be, and in the usual case will be, a rotary electric motor mechanically coupled as by gearing to the movable element of a tuning instrumentality such as a variable condenser.

Because the motor and the gears usually employed must have a certain amount of inertia and because the relays controlling the motor do not operate instantaneously, a certain time interval elapses between the time when the tuning instrumentality should stop moving and the time when it actually does stop.

In accordance with our invention, we provide means whereby this overrun, as it is called, may be reduced to a minimum and to a constant value in terms of frequency change of the tuned circuits, whereby it may be compensated for to as exact a degree as may be, thereby assuring that when the receiver comes to rest after searching for a new signal, the signal will be tuned in with a greater degree of accuracy than could be achieved manually.

Also in accordance with our invention, we may provide means whereby the receiver may be tuned manually, if desired, without interfering with its operation on the signal seeking principle, and we advantageously employ certain of the manual tuning parts in the motor tuning operation.

Among the objects of our invention may be mentioned:

To provide a signal seeking receiver in which the tuning may be either motor operated, under the control of incoming signals, or manually operated.

To provide a receiver in which any desired relation may be obtained between the degree of movement of the manual controlling means, or of the motor tuning means, and the change of frequency in the receiver tuning.

It is still a further object of our invention to provide an improved drive, clutch, and brake mechanism, in which the number of parts required is small and the cost thereof is reduced to a minimum.

It is still a further object of our invention to provide a receiver of the class described with a motor tuning drive and manual drive, the frequency determining element being normally clutched to the manual drive, but being shiftable to the motor drive whenever it is desired to operate the receiver as a signal seeking receiver.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which Fig. 1 is a simplified circuit diagram of the receiver showing as much of the circuits as is necessary to an understanding of this invention, Fig. 2 is a cross-sectional elevation on lines 2—2 of Fig. 3, with certain of the parts removed or broken away for simplicity, Fig. 3 is a side elevation of the cam side of the drive of Fig. 2, and Fig. 4 is the sectional elevation on lines 4—4 of Fig. 2.

Referring more particularly to Fig. 1, 10 represents an antenna connected to the signal seeking receiver diagrammatically indicated by rectangle 11. This may be a receiver of the superheterodyne or tuned radio frequency type, the audio output of which is amplified by amplifier 12 and operates loud speaker 13.

The frequency controlling instrumentalities, which may be variable condensers or variable inductances, may be driven by motor 16 through the interposed clutch, brake, and drive mechanism shown in Figs. 2, 3, and 4.

The motor may be energized from a suitable power source 17 controlled by armature 15a and back contact 15b of relay 15 connected in the selector and motor control circuit diagrammatically indicated as 14. The details of the selector and motor control circuit as herein indicated form per se no part of this invention, and the same are well known to those skilled in the art.

In general it may be stated, for aid in understanding the present invention, that the selector and motor control circuit comprises an extremely selective circuit usually having a greater degree of selectivity (narrower band width) than the selecting circuits of the receiver itself, and the output of the selector circuit is applied to a control tube, preferably, but not necessarily, of the thyratron type, so that when the receiver is tuned to an incoming signal of predetermined strength, the tube passes plate current, energizing relay winding 15 and actuating armature 15a, breaking the motor and solenoid circuit between armature 15a and back contact 15b.

When this happens, the motor is declutched from the tuner and the circuit will remain tuned to the desired signal until switch 18 is pressed, opening the plate circuit of the control tube and permitting armature 15a to close against back contact 15b and re-establish the motor circuit. It will be noted that the motor current passes through solenoid 19.

The tuning instrumentality, in this case indicated as coil 21, of the permeability tuning type having movable iron core 20, is arranged to be driven either by motor 16, through suitable clutch and gearing, or by manual tuning knob 9, the latter being mounted on shaft 22 carried in housing 23, and in turn carrying worm 24, the latter meshing with gear 25, carried by bushing 26 on shaft 27.

Shaft 27 may be mounted in the housing 23 for longitudinal movement in a small degree, and may be spring biased, as by spring 28, to the left-hand position shown in Fig. 2. Mounted centrally on shaft 27 we may provide gear 29 free to rotate on shaft 27, but held against axial movement by collars 30 pinned to the shaft.

Gear 29 may mesh with gear 31 fixed to shaft 32 extending through housing 23 and carrying exterior thereto cam 33, upon which rides follower 34 carried on lever 35 pivoted as at point 36. Follower 34 may be spring biased against the cam as by spring 37, and the outer end of lever 35 may be pivoted to connection 38, driving core 20. While for the sake of simplicity, we have shown only one coil and core, it will be understood that as many may be provided as are necessary or desired, all driven by connection 38.

It may now be seen that rotation of manual tuning knob 9 will turn worm 24 and thereby gear 25. Gear 29 is provided on opposite faces with layers of cork, rubber, or other friction material 40, and in the position shown in Fig. 2, gear 29 is spring biased against gear 25, and as gear 25 rotates, gear 29 is driven, thereby rotating freely on shaft 27.

Gear 29 drives gear 31 and thereby cam 33. As cam 33 rotates in the direction shown by the arrow in Fig. 3, follower 34 will be gradually pushed upward, imparting a clockwise rotation to lever 35 against the action of spring 37, and moving its outer end down, thereby withdrawing core 20 from coil 21 and increasing the frequency of the circuit tuned thereby.

As the roller reaches and passes the high point of the cam, it will be snapped inward quickly by the action of spring 37, pushing core 20 back into coil 21 to the full extent of its motion; and further operation of tuning knob 9 in the same direction will carry the tuning into another cycle.

Reverse rotation of manual knob 9 will result in roller 34 reaching the low point of cam 33, at which point it is locked against further motion; but continued rotation of manual knob 9 will do no damage because the clutch connection between gear 29 and gear 25 will slip, and the dial indicator (not shown), which preferably is associated with lever 35, will remain at the same position, advising the operator that he has reached the limit of tuning in that direction.

It will be noted that coil 19 is mounted on the left-hand side of the clutch and brake assembly of Fig. 2, and when the motor circuit is closed, solenoid 19, which may be mounted in a cup 19a of magnetic material, is energized. This attracts core piece 42, causing it to move to the right in Fig. 2 against the action of spring 37, shifting shaft 27, on which it is mounted, to the right and disengaging gear 29 from gear 25, and engaging on its opposite face with gear 43, which is meshed with pinion 44, carried by the shaft of motor 16.

Since the motor is now rotating, as soon as gear 29 engages gear 43, gear 29 will be set into rotation and gear 31 will be driven as before, driving roller 34 through cam 33, and operating the tuning instrumentality as for manual tuning.

Since the motor is set into rotation only when the receiver is operating on the signal seeking principle, as soon as a signal of predetermined strength is tuned in, relay 15 will be energized, and the circuit of motor 16 and that of solenoid 19 will be broken. Spring 28 will push shaft 27 to the left, disengaging the face of gear 29 from face of gear 43, and causing it to engage the face of gear 25.

This latter gear will now be stationary since the manual tuning knob is not being operated, and the contact between the faces of gears 25 and 29, which formerly acted as a clutch to transmit motion from manual knob 9, will act as a brake on gear 29 and the tuning mechanism driven thereby, due to the worm connection between worm 24 and gear 25, which is irreversible.

Thus, immediately as shaft 27 moves to the left, the brake contact is set up, and since the inertia of these moving parts is very small, practically instantaneous stoppage of the tuning occurs. This clutch and brake mechanism also insures against accidental displacement, and hence detuning of the tuning instrumentality, by mechanical jar or jolting of the receiver, which is likely to occur in an automobile.

The determination of the shape of cam 33 is relatively simple, and by it the frequency change characteristics of the receiver can be controlled in terms of angular motion of the motor or of manual tuning knob 9. Suppose, for example, that the change of frequency of the tuning circuits is not uniform with motion of core 20 into coil 21. It is still possible to provide constant frequency change for predetermined angular rotation of either knob 9 or motor 16, and this may be done by tuning the receiver in steps of 10 kc. from one end of the spectrum to the other and plotting the position of roller 34 for each 10 kc. step.

The points thus determined may be laid out on the cam blank in equiangular steps, and when joined by a smooth curve will represent the contour of the cam. Thus, although the motion of core 20 may be non-linear with respect to frequency change produced by such motion, this may be compensated for by proper shaping of the cam.

In the same manner changes in the rate of frequency change on various parts of the dial may be obtained. For instance, it may be desired to have the frequency change more rapidly at the low frequency end of the spectrum and more slowly at the high frequency end of the spectrum, but in any event the procedure for determining the shape of cam 33 is the same in principle; the desired position of core 20 being determined by variation in angular positions of knob 9 or of the motor, and the cam curve constructed accordingly.

If the tuning speed is high, it is possible that the overrun may exceed the allowable amount even when using a constant frequency change drive. In this case electrical compensation may be employed as described in the application of Verlis H. Wiley, Serial No. 534,389, in a manner to compensate for overrun of the tuner.

If the electrical compensation does not compensate uniformly throughout the entire band width, nevertheless, with the use of a cam as herein described the cam can be so shaped that the amount of overrun in terms of cycles, minus the amount of compensation in cycles, equals zero throughout the entire band.

While we have shown and described certain preferred embodiments of our invention, it will be understood that modifications and changes may be made without departing from the spirit and scope thereof, as will be clear to those skilled in the art.

In this application we have explained the principles of our invention and the best mode in which we have contemplated applying those principles, so as to distinguish our invention from other inventions; and we have particularly pointed out and distinctly claimed the part, improvement, or combination which we claim as our invention or discovery.

We claim:

1. In radio apparatus, in combination, a movable element, manual and power means for driving said element, said manual drive including an irreversible mechanical coupling, a shaft, a pair of driving members mounted on said shaft, a driven member on said shaft between said driving members, said driven member having friction material on opposite faces thereof, a spring for urging said shaft in one direction axially, a solenoid for moving it in the opposite direction and means for engaging said manually operated means as soon as said power operated means is disengaged.

2. In radio apparatus, in combination, a movable element, manual and electric power means for driving said element, said manual drive including an irreversible mechanical coupling, a shaft, a pair of driving members mounted on said shaft, a driven member on said shaft between said driving members, said driven member having friction material on opposite faces thereof, a spring for urging said shaft in one direction axially, a solenoid for moving it in the opposite direction, said solenoid being in circuit with said power means and means for engaging said manually operated means as soon as said power operated means is disengaged.

ALVIN D. MEYER.
CARL F. CARLZEN.

REFERENCES CITED

The following references are of record in the file of this patent:

UNITED STATES PATENTS

| Number | Name | Date |
|---|---|---|
| Re. 21,282 | Polydoroff | Nov. 28, 1939 |
| 1,723,399 | Belcher | Aug. 6, 1929 |
| 2,184,032 | Allen | Dec. 19, 1939 |
| 2,208,453 | Forstrom | July 16, 1940 |
| 2,284,353 | Allen | May 26, 1942 |
| 2,285,540 | Stein et al. | June 9, 1942 |
| 2,348,460 | Fennema et al. | May 9, 1944 |
| 2,352,140 | Trott | June 20, 1944 |